Sept. 29, 1953  F. O. WORDEN  2,653,575
LIQUID APPLICATOR FOR ANIMALS
Filed Dec. 21, 1951
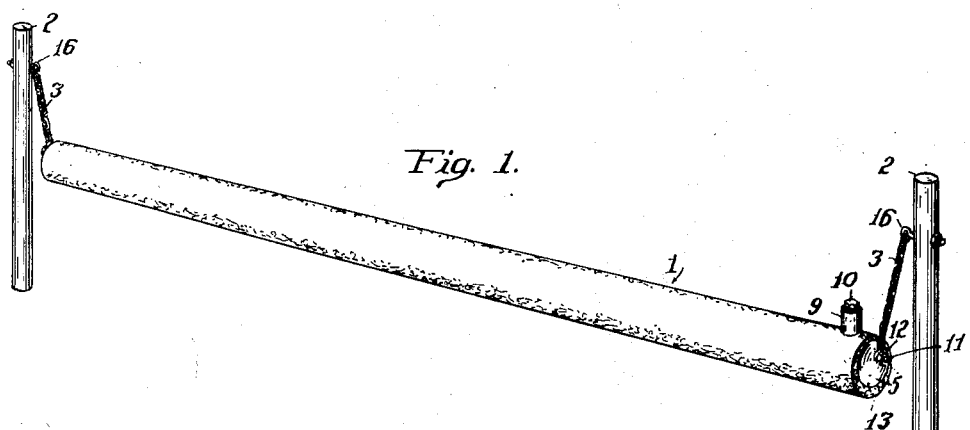
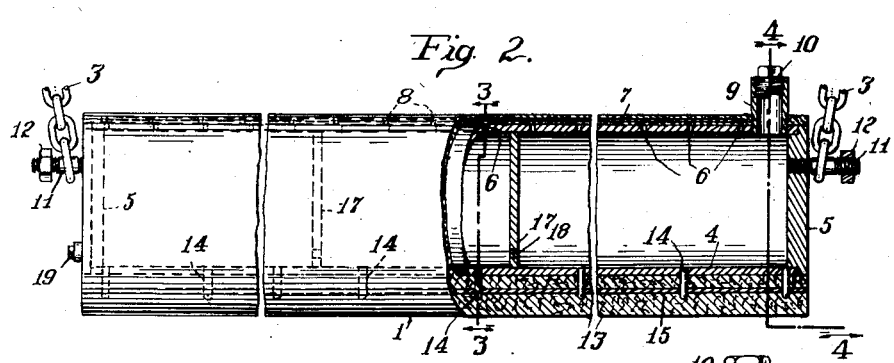
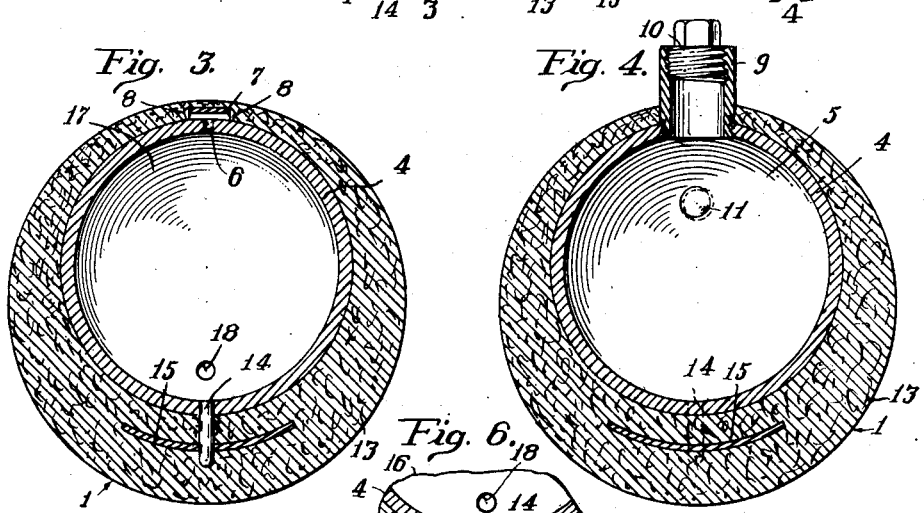
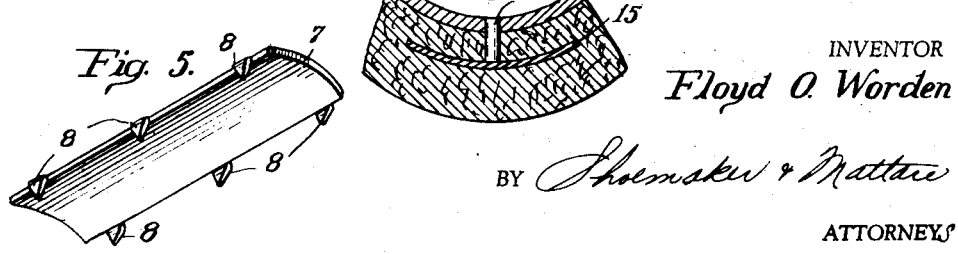
INVENTOR
Floyd O. Worden
BY Shoemaker & Mattare
ATTORNEYS Patented Sept. 29, 1953

2,653,575

UNITED STATES PATENT OFFICE 2,653,575

LIQUID APPLICATOR FOR ANIMALS

Floyd O. Worden, Alliance, Nebr., assignor to Willia Edna Worden, Alliance, Nebr.

Application December 21, 1951, Serial No. 262,701

13 Claims. (Cl. 119—157)

This invention relates to a liquid applicator for animals and while it is particularly adapted for applying oils or antiseptics to animals for killing ticks and other insects, or for curing skin diseases, it will be understood that other liquids may be applied to cattle, hogs, or other animals.

When an animal is infected by ticks or skin diseases, it is necessary to apply antiseptics and other liquids in order to kill ticks or other insects, or heal skin irritations. This is often difficult to accomplish without waste of the liquid used, and in addition, attendants are liable to be injured, and it is, therefore, one object of the invention to provide a liquid applicator which may be mounted across a chute or driveway in such position that as animals are driven forwardly, they will pass under the applicator and liquid will be applied to the animals by rubbing contact of the applicator with the backs of the animals.

Another object of the invention is to provide the liquid applicator wherein a cylindrical container is suspended between posts or equivalent supports by flexible members such as chains, which allow the container to have swinging movement imparted to it by contact with the back of an animal passing beneath it, the chains also allowing the container to be tilted from its normal position toward a position in which liquid in the container may flow outwardly through small discharge perforations in the upper portion of the container and thus moisten an absorbent covering for the container which in its turn applies the liquid to the animal passing beneath the container.

Another object of the invention is to provide an applicator of this character which may be filled, when necessary, and is divided into compartments by partitions having small openings in their lower portions so that while the liquid in the container may flow from one end toward the other and thus maintain an even depth throughout the liquid in the container, such flow of liquid longitudinally in the container will be prevented from moving too freely longitudinally in the container in case it is tilted by an animal passing under one end portion of the container instead of midway the length thereof.

Another object of the invention is to provide a liquid applicator of this character wherein the covering of absorbent material is of greater thickness about the lower portion of the container and wherein a strip or pan is embedded in the lower portion of the covering material so that liquid which may drain downwardly along sides of the container will be caught in the distributing pan and thus be evenly distributed throughout the length of the thick lower portion of the covering when the applicator is tilted by rubbing contact with an animal.

Another object of the invention is to provide a liquid applicator which is of simplified construction and will not be liable to get out of working order if left outdoors and exposed to weather during its use.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

A practical embodiment of the invention is illustrated in the accompanying drawings, wherein:

Fig. 1 is a perspective view showing the improved liquid applicator suspended between posts in position for use;

Fig. 2 is a view of the applicator upon an enlarged scale, shown partially in side elevation and partially in longitudinal section;

Fig. 3 is a sectional view upon an enlarged scale, taken transversely through the applicator along the line 3—3 of Fig. 2;

Fig. 4 is a similar view taken through the applicator along the line 4—4 of Fig. 2;

Fig. 5 is a perspective view of a portion of a strip or shield mounted upon the applicator over discharge openings therein and serving to prevent rain water from entering the container through the discharge openings;

Fig. 6 is a fragmentary sectional view showing a modified construction.

The applicator which is indicated in general by the numeral 1 may be of any length and diameter desired and has been shown suspended between the posts 2 by loosely flexible elements which may be chains 3, ropes, flexible metal cables, or the like. It will be understood that the applicator may be suspended between side walls of a chute or between posts or the like at opposite sides of a gateway through which animals pass from one field to another.

The container 4 of this improved applicator is of cylindrical formation and may be formed of sheet metal or other suitable material, ends of the container being closed by heads 5 which may be formed integral with the container or secured to ends of the annular wall of the container. The upper portion of the container is provided with small discharge openings 6 which are spaced from each other longitudinally of the container and in order to shield these discharge openings and prevent rain water from readily entering the same, there has been provided a strip 7 which extends longitudinally of the container in covering relation to the discharge openings. Prongs 8 extend from opposite side edges of the shield and have contacting engagement with the outer surface of the annular wall thereof in spaced relation to opposite sides of the discharge openings. The shielding strip will thus be held in spaced relation to the outer surface of the container wall and when the container is tilted liquid in the container may flow outwardly through the discharge openings and along the surface of the container through spaces between the container and the side edges of the strip. A filling neck 9 projects upwardly from the container at one end thereof and is normally closed by a plug 10 which is screwed into the outer end portion of the neck so that it may be readily removed when replenishing the liquid in the container is necessary.

This container must be normally disposed in a position presenting its discharge openings 6 upwardly and in order to do so, there have been provided pins 11, which extend longitudinally of the container in alignment with each other and are disposed in upwardly offset relation to centers of the heads 5. After the stems or pins have been passed through lower links of the chains 3, nuts 12 are applied to their outer end portions to retain the chains in engagement with the pins and thus prevent the pins from slipping out of suspending engagement with the chains. While these stems or pins have been shown screwed into threaded openings formed in the heads, it will be understood that they may be welded to the heads or secured thereto in any desired manner.

A covering 13, which is formed of absorbent material, fits snugly about the cylindrical container with a portion extending across the shield 7 and thereby held out of blocking relation to the outer ends of the openings 6. Referring to Figs. 3 and 4, it will be seen that this covering is gradually reduced in thickness from below the container to the upper portion thereof. Therefore, liquid discharged from the openings 6 and flowing downwardly along sides of the container will not be liable to drip from the applicator as the absorbent capacity of the covering increases towards its lower portion. This covering may be formed of felt, or any other suitable material which will absorb the liquid and from which the liquid will be readily transferred to a portion of an animal having rubbing contact with the applicator when an animal passes under the applicator with its back or other portions in rubbing engagement with the covering.

Pins which extend downwardly from the lower portion of the container and are spaced from each other longitudinally thereof, are embedded in the thick lower portion of the covering and serve very effectively to prevent this covering from turning about the container or moving longitudinally thereof. The pins may pass through a distributor pan 15 which is formed of sheet metal or the like and is arcuate transversely, as shown in Figs. 3 and 4, or the pan may be solid and the pins contact the upper surface thereof, as shown in Fig. 6, or terminate above the upper surface of the pan. This pan serves to catch liquid which flows downwardly along sides of the container and then moves downwardly through the thick lower portion thereof from the under portion of the container when the applicator has remained in its normal position for an extended length of time without animals passing under it in rubbing contact with the covering. When an animal passes under the applicator, contact of the animal's back with the covering will swing the applicator about the eye bolts 16 with which upper ends of the chains are connected with the posts 2, and in addition the container will be tilted out of its normal position toward an inverted position with the stems or pins 11 serving as pivots for the container. When this movement takes place, the liquid in the container flows outwardly through the discharge openings 6 to moisten the absorbent covering and in addition any liquid which has accumulated in the pan 15 will flow from one side thereof. Therefore, the liquid absorbed by the covering will be wiped from the covering onto the skin of the animal and this liquid will kill ticks or other insects and also may heal sores or skin irritations in case the container is filled with liquid of the appropriate type. After the animal has passed from under the applicator, it returns to its normal position where it remains until another animal passes beneath it. It will thus be seen that the covering will be kept moist by successive applications of liquid to it. If an animal passes under the applicator near one end thereof instead of approximately midway its length, or two animals of different sizes pass under the applicator at the same time flexibility of the suspension members 3 allows the applicator to be tilted longitudinally to a position in which one end is higher than the other. Therefore, liquid in the container would be liable to be discharged in greater volume from the lower end portion of the container. In order to prevent this, there have been provided a suitable number of partitions 17 which are spaced from each other longitudinally of the container and thus divide the container into a plurality of compartments which have communication with each other through small openings 18 formed through lower portions of the partitions. These small openings allow the liquid to flow slowly from one compartment to another and thus maintain an even depth throughout the length of the container, but they are not large enough to allow rapid flow of the liquid and the liquid will at all times be maintained at substantially an even depth throughout the length of the container. By unscrewing the plug 19 at the opposite end of the container from the filling neck, liquid may be allowed to drain out of the container and when doing so the applicator may be held in a tilted position so that the container will be completely emptied.

What is claimed is:

1. A liquid applicator for animals comprising a cylinder circular in cross section and having heads at opposite ends, aligned stems at opposite ends of said cylinder projecting outwardly from the heads and disposed in upwardly eccentric relation to centers of the heads, posts, eyebolts passing through said posts transversely thereof, chains having links at their upper ends engaged through the eyebolts, said stems passing through links at lower ends of said chains, nuts upon outer ends of said stems and holding the chains in engagement with the stems, said stems mounting the cylinder for tilting movement about the stems and the chains mounting the cylinder for swinging movement about the eyebolts, the upper portion of said cylinder having discharge perforations spaced from each other longitudinally of the cylinder, a filling neck projecting upwardly from said cylinder and having a removable closure, a strip along said cylinder constituting a shield for the perforations, pins extending downwardly from the lower portion of said cylinder and spaced from each other longitudinally of the cylinder, a jacket of absorbent material surrounding said cylinder and decreasing in thickness towards the perforated upper portion thereof, and a pan extending longitudinally in said jacket under said cylinder and formed with openings through which said pins pass.

2. A liquid applicator for animals comprising a cylinder having heads closing opposite ends, stems projecting outwardly from said heads in upwardly eccentric relation to centers thereof, supports, suspension member having upper ends connected with said posts and at their lower ends being loosely engaged with said stems, said suspension members mounting the cylinder for swinging movement and the stems mounting the cylinder for tilting movement, the eccentric relation of the stems to the heads causing the cylinder to normally assume a position wherein a portion formed with discharge openings is disposed upwardly, pins extending downwardly from the normally downwardly presented portion of said cylinder, a jacket of absorbent material about said cylinder, and a plate embedded in the lower portion of said jacket and extending longitudinally thereof in spaced relation to the cylinder and having openings through which the pins pass.

3. A liquid applicator comprising a cylinder closed at opposite ends and having an upper portion provided with discharge perforations, supports, flexible members carried by and suspended from said supports and having swinging movement relative to the supports, said flexible members having lower ends loosely connected with opposite ends of said cylinder in upwardly offset eccentric relation to the cylinder and tiltably mounting the cylinder at lower ends of the flexible members, the cylinder having swinging movement with the flexible members, a strip extending along the upper portion of said cylinder in shielding relation to the discharge perforations, a covering of absorbent material extending about said cylinder, and a pan embedded in said covering under the cylinder and extending longitudinally of the cylinder in downwardly spaced relation thereto.

4. A liquid applicator comprising a container having an upper portion provided with discharge perforations, supporting means including flexible members swingably mounted at their upper ends and having lower ends pivotally connected with the container in upwardly eccentric relation thereto, said flexible members mounting the container for swinging and tilting movement to a discharging position by contact with an animal passing under the container, and a covering of absorbent material for said container.

5. A liquid applicator comprising a cylindrical container closed at opposite ends and provided with discharge openings in its upper portion, suspension members swingably mounting said container and having pivotal connection with the container in upwardly eccentric relation thereto, a covering of absorbent material fitting about said container and gradually decreasing in thickness towards its upper portion, a pan embedded in the thick lower portion of said covering and extending longitudinally thereof under the container, and pins depending from said container and passing downwardly through the covering and engaging the pan and holding the covering and the pan against movement about the container and also preventing movement of the pan relative to the covering.

6. A liquid applicator comprising a cylindrical container closed at opposite ends and provided with discharge openings in its upper portion, loosely flexible suspension members swingably and tiltably mounting said container for movement from a normal position in which its discharge openings are presented upwardly to a tilted position allowing flow of liquid from the discharge openings, a covering of absorbent material fitting about said container, and pins carried by and projecting outwardly from said container into said cover and presenting movement of the cover relative to the container.

7. A liquid applicator for animals comprising a horizontal container having an upper portion provided with discharge openings along its vertical diameter, flexible suspension members loosely connected with opposite ends of the container in upwardly eccentric relation thereto and mounting said container for both swinging and tilting movement by contact with the back of an animal from a normal position disposing the discharge openings upwardly towards a position allowing flow of liquid from the discharge openings, a cover of absorbent material about said container, and a distributor embedded in said cover under said container and spaced downwardly from the container.

8. A liquid applicator for animals comprising a horizontal container having an upper portion provided with discharge openings, pins projecting from opposite ends of said container in upwardly eccentric relation thereto, flexible suspension members loosely engaged with said pins and mounting said container for swinging and tilting movement by rubbing contact with an animal from a normal position towards a position allowing flow of liquid from the discharge openings, a cover of absorbent material fitting snugly about said container, and partitions in said container spaced from each other and having lower portions formed with perforations allowing retarded flow of liquid between chambers into which the container is divided by the partitions.

9. A liquid applicator comprising a cylindrical container having an upper portion provided with discharge openings, supporting means, loosely flexible suspension members pivotally connected to said container and swingably connected to said supporting means and mounting said container for movement by rubbing contact with the back of an animal passing under the container, the container being thereby moved transversely from its normal position presenting its discharge openings upwardly to a partially inverted position allowing liquid to flow out of the discharge openings, and a cover of absorbent material about said container.

10. A liquid applicator for animals comprising a container having an upper portion provided with discharge openings, supporting means, suspension members pivotally connected to said container and swingably connected to said supporting means and mounting said container for movement by rubbing contact with an animal from a normal position towards a position allowing flow of liquid from the discharge openings, a cover of absorbent material about said container, a stiff strip extending along the upper portion of the container and under the upper portion of said cover in bridging and shielding relation to the discharge openings, and depending prongs spaced from each other along opposite side edges of said strip and contacting the container in upwardly spaced relation to opposite sides of the openings and holding the strip and the portion of the cover extending across it in outwardly spaced relation to the portion of the container having the discharge openings therein.

11. A liquid applicator comprising an elongated substantially cylindrical container closed at opposite ends, said container having at least one discharge opening in the side thereof, support means for swingably mounting said container comprising eccentric connections at its opposite ends, loosely flexible suspension means pivotally connected to said eccentric connections, said suspension means being swingably connected to overhead supporting means.

12. The structure of claim 11 wherein the eccentric connections are offset relative to the center of the container towards the same side thereof having the discharge opening therein, said container having a covering of absorbent material, whereby liquid discharged from the opening will be absorbed and applied to animals contacting the covering.

13. The structure of claim 11 wherein the eccentric connections are offset radially of the center of the container in the direction of the side of the container having the discharge opening therein, and the loosely flexible suspension means consisting of elongated members having lower ends swiveled to the eccentric connections and upper ends adapted to be pivotally connected to an overhead support.

FLOYD O. WORDEN.

References Cited in the file of this patent

UNITED STATES PATENTS

| Number | Name | Date |
|---|---|---|
| 1,305,965 | Doty | June 3, 1919 |
| 1,358,608 | Ausen et al. | Nov. 9, 1920 |
| 1,492,142 | Shoemaker | Apr. 29, 1924 |
| 1,817,449 | Vaughan | Aug. 4, 1931 |
| 1,845,599 | Haviland | Feb. 16, 1932 |
| 1,891,779 | Robbins | Dec. 20, 1932 |
| 2,169,499 | Niemeyer | Aug. 15, 1939 |